United States Patent [19]

Lentz

[11] Patent Number: 4,757,158
[45] Date of Patent: Jul. 12, 1988

[54] AIR-VAPOR BARRIER BOX

[76] Inventor: Stephen K. Lentz, 990 Mink La., Campbellsport, Wis. 53010

[21] Appl. No.: 31,797

[22] Filed: Mar. 30, 1987

[51] Int. Cl.$^4$ ............................................... H02G 3/08
[52] U.S. Cl. ......................................... 174/53; 220/3.3
[58] Field of Search ................ 174/53, 58; 220/3.2, 220/3.3, 3.4, 3.5, 3.6

[56] References Cited

U.S. PATENT DOCUMENTS

| | | | |
|---|---|---|---|
| 3,684,819 | 8/1972 | Wilson | 174/53 |
| 3,863,037 | 1/1975 | Schindler et al. | 174/58 |
| 4,296,870 | 10/1981 | Balkwill et al. | 220/3.3 |
| 4,345,693 | 8/1982 | Balkwill et al. | 220/3.3 |
| 4,408,695 | 10/1983 | Balkwill et al. | 220/3.3 |
| 4,626,617 | 12/1986 | Rye | 174/53 |
| 4,673,097 | 6/1987 | Schuldt | 220/3.3 X |
| 4,685,581 | 8/1987 | Kaneda et al. | 220/3.3 X |

Primary Examiner—A. T. Grimley
Assistant Examiner—David A. Tone
Attorney, Agent, or Firm—Donald Cayen

[57] ABSTRACT

A five-sided air-vapor barrier box seals an electrical outlet box in a building wall. The barrier box has an open side, around which outwardly extend reinforced flanges perpendicular to the associated barrier box walls. The back surface of a flange is placed against the face of a wall stud, and a barrier box side wall is placed against the side of the stud. The electrical outlet box and barrier box are nailed together to the stud through the barrier box side wall. A thin sheet of moisture impervious material is placed over the wall studs and barrier box. An opening in the film is cut approximately coextensive with the barrier box open side. A bead of caulk is deposited on the flanges, and the film is pressed against the flanges, thereby creating an air and moisture seal. The barrier box and film are then covered with the finish wall covering. The barrier box walls are made of two thicknesses. The wall portions adjacent the flanges are of a relatively great thickness to provide rigidity to the barrier box. The wall portions adjacent the back wall are relatively thin for easy opening for inserting wires through the barrier box.

17 Claims, 2 Drawing Sheets

AIR-VAPOR BARRIER BOX

BACKGROUND OF THE INVENTION

1. Field of the Invention.

This invention pertains to energy conservation, and more particularly to apparatus for reducing energy losses in buildings.

2. Description of the Prior Art.

Extensive efforts have been made in recent years to lower energy consumption. Building heat losses have drawn much attention, and numerous new construction products and methods have been developed to decrease those losses.

It is well known that a great amount of building heat is lost to the outside through conventional wall electrical outlet boxes. At the same time, cold outside air can enter a heated area through the electrical outlet boxes and thereby displace the expensive heated air. To reduce the heat losses associated with electrical outlet boxes, it is known to partially enclose them within air impervious covers. Examples of such covers may be seen in U.S. Pat. Nos. 4,158,420; 4,345,693; and 4,408,695. The various covers disclosed in those patents are made from flexible materials. The walls are quite thin and easy to cut for passing electrical wires through the walls. The covers also have flat thin-wall flanges that slant away from the cover. The prior covers have not proven entirely satisfactory. That is primarily because the slanting flanges must be pressed tightly against a building wall member, such as a gypsum board, so as to bend the flanges. The bent flanges exert a force on the wall board to create a seal between the flanges and the board surface. Bending the flanges causes them to become stressed, and the flanges and flexible cover walls therefore tend to distort. Consequently, despite exerting force on the wall board, the flanges may not seal properly, and air can flow past the flanges into and out of the heated area. Further, a builder can never be certain that an effective seal has been created, because the cover and flanges are hidden from view by the wall board.

Thus, a need exists for improved air seals around building wall electrical outlet boxes.

SUMMARY OF THE INVENTION

In accordance with the present invention, inexpensive and convenient shielding is provided that prevents the flow of air past building wall electrical outlet boxes. This is accomplished by apparatus that includes an air-vapor barrier box designed to receive a conventional electrical outlet box and having stiff coplanar flanges.

The air-vapor barrier box comprises a five-sided structure having a back wall and four side walls. The five walls may be orthogonal to each other, and they define a space suitable for accepting a conventional electrical outlet box. To the free end of each side wall is integrally secured a flange that is perpendicular to the respective wall. At least some of the flanges are reinforced with gussets extending between the flange and the associated side wall.

Further in accordance with the present invention, the side walls are made in two thicknesses. The wall material at the portion of each wall adjacent the flange is made relatively thick. The wall material at the wall portion adjacent the back wall is made relatively thin. The back wall is relatively thick. Consequently, the air-vapor barrier box combines the advantages of a stiff construction for the flanges, the side walls adjacent the flanges, and the back wall to resist distortion with thin wall portions for ease of cutting for passing wires through the box. The variation in wall thickness may be abrupt, as by a discrete step between the thick and thin portions. Alternately, the variation in wall thickness may be gradual, with the walls tapering gradually from the thick to the thin portions.

In use, an unreinforced flange of the air-vapor barrier box is placed against the front face of a wall stud, with the corresponding box side wall held against the side of the stud. The electrical outlet box is placed within the box. Depending on the size of the electrical outlet box used, its back wall may seat against the box back wall. The electrical outlet box is nailed to the side of the stud in the usual manner, with the nails passing through the thick portion of a box side wall to hold it rigidly in place on the stud. The box is slit in the appropriate thin wall portion for the required wires. Accoustical or silicone caulking is used to seal the wire slits. The usual building insulation is installed. A vapor barrier film is placed over the insulation and receptacles in known manner. An opening is cut in the film to suit the size of the box opening. A bead of caulk is applied around the flanges and the film is pressed against the rigid flanges, thereby creating an air and moisture seal that can be checked before installing the finished wall board.

Other aims and advantages of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 2:
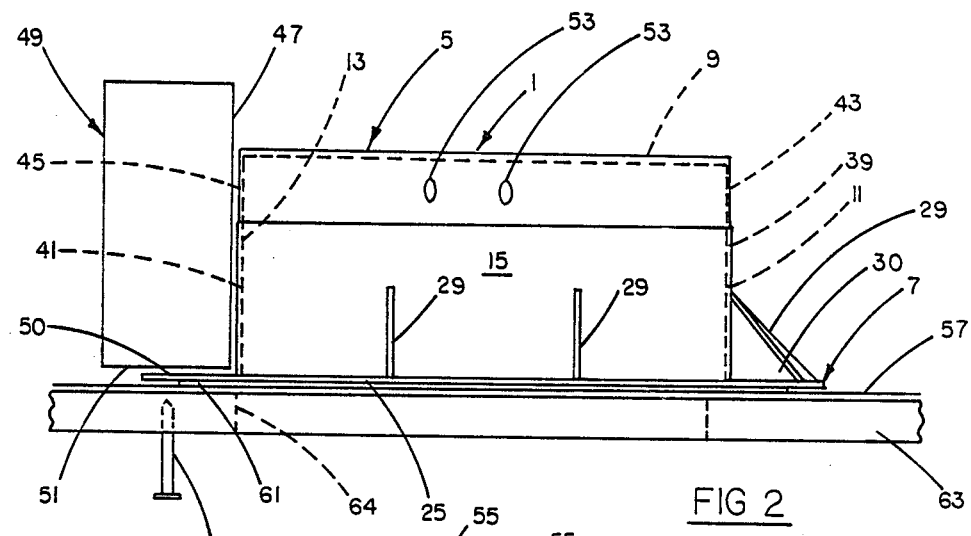
FIG. 2 is a top view of the air-vapor barrier box installed in a building wall.
Figure 1:
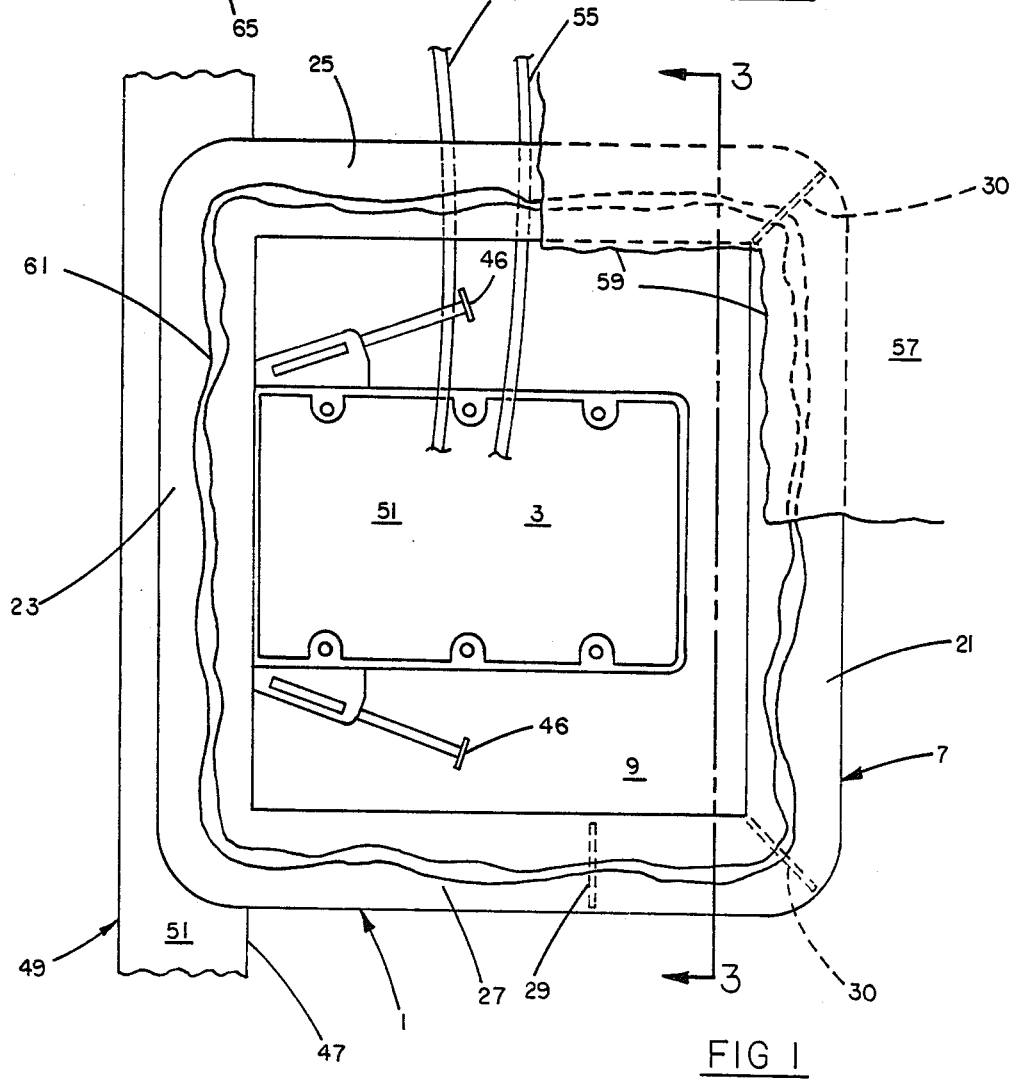
FIG. 1 is a front view showing the air-vapor barrier box of the present invention installed with an electrical outlet box.
Figure 3:
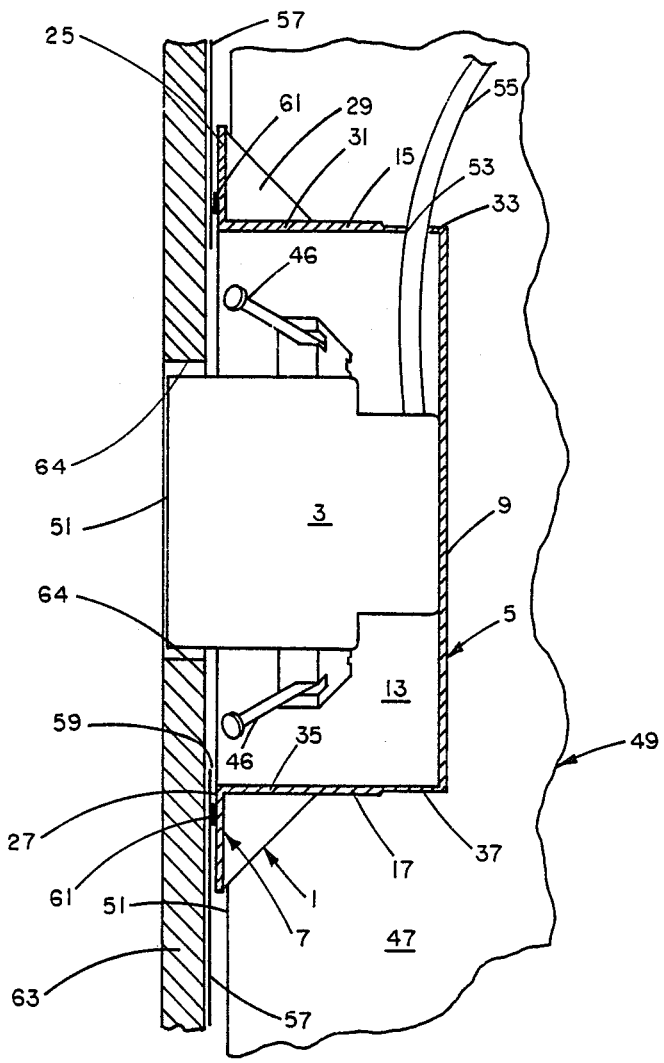
FIG. 3 is an enlarged cross sectional view taken along lines 3—3 of FIG. 1.

Referring to FIGS. 1—3, an air-vapor barrier box 1 is illustrated that includes the present invention. The air-vapor barrier box is particularly useful for preventing air and moisture flow past electrical outlet boxes 3 in building walls. However, it will be understood that the invention is not limited to building construction applications.

The air-vapor barrier box 1 comprises a container section 5 and a flange section 7. The container section 5 comprises a back wall 9, two side walls 11 and 13, a top wall 15, and a bottom wall 17. The walls 11, 13, 15, and 17 are joined to the back wall 9 to create an enclosure having five closed sides and one open side. The flange section 7 is comprised of side flanges 21 and 23, top flange 25, and bottom flange 27. Each flange 21, 23, 25, and 27 is preferably flat for its entire width and extends at substantially right angles to the respective walls. To provide stiffness and rigidity to the flanges 21, 25, and 27, a series of triangular shaped gussets 29 are employed between those flanges and their associated walls. In FIG. 2, two gussets 29 are shown, but a larger number can be used if desired. In addition, angular gussets 30 may be used at the junctions of the flanges 21, 27 and 21, 25 and the corners of the associated walls, as best shown in FIG. 1. No gusset is used between side wall 13 and flange 23, nor are there any angular gussets at the junctions of the flanges 23, 25 and 23, 27, as will be explained subsequently.

To further increase the stiffness of the container section 5 and flange section 7 of the air-vapor barrier box 1, the portions of the side, top, and bottom walls adjacent the respective flanges are relatively thick. At the same time, the wall portions adjacent the back wall 9 are made relatively thin. Referring especially to FIGS. 2 and 3, it is seen that the top wall 15 has a portion 31 adjacent flange 25 that has a greater wall thickness than the portion 33 adjacent the back wall. Similarly, the bottom wall 17 has a portion 35 with a greater wall thickness than the portion 37. The side walls 11 and 13 have portions 39 and 41 that are thicker than the portions 43 and 45, respectively. In some instances it may be desirable that the side wall 13 adjacent side flange 23 be made entirely with the thick wall portion 41.

The air-vapor barrier box 1 of the present invention may be made of any suitable material. A preferred material is a low density polyethylene thermoplastic. For increased protection to building occupants and contents, the barrier box material may include additives that retard fire and gas formation when exposed to high temperatures.

The air-vapor barrier box 1 may be fabricated in any size suitable for enclosing a conventional electrical outlet box 3. However, it is preferred that the barrier box be large enough to accept a 46 cubic inch three-gang plastic outlet box as shown in FIGS. 1 and 3 and as manufactured by Allied Moulded Company, Bryan, Ohio. For that purpose, the outside dimensions of the barrier box container section 5 are approximately 7.50 inches high, 6.50 inches wide, and 2.88 inches deep. That size will readily accept the three-gang outlet box illustrated by reference numeral 3, and there is plenty of room for swinging a hammer to pound outlet box mounting nails 46, as will be explained. The flanges 21, 23, 25, and 27 may be approximately 1.25 inches wide. The preferred thickness of the back wall 9, flanges, gussets 29, and thick side wall portions 31, 35, 39, and 41 is approximately 0.07 inches. The thin wall portions 33, 37, 43, and 45 are preferably approximately 0.035 inches thick, with the thin portions extending approximately 0.88 inches from the back wall.

To use the air-vapor barrier box 1 of the present invention, the side wall 13 is placed against the side 47 of a building stud 49 in the location desired for mounting an electrical outlet box 3. For clarity, in FIGS. 2 and 3 the various components to be described hereinafter are shown with gaps between them. It will be appreciated that in practice the components will be assembled in tight facing contact. The back surface 50 of the barrier box side flange 23 is pressed against the front face 51 of the stud 49. The lack of gussets between the barrier box wall 13 and flange 23 enable the barrier box to be positioned against the stud as described. The electrical outlet box is placed within the barrier box such that the open side 51 protrudes beyond the barrier box flanges an amount that suits the thickness of the finish wall board 63. In FIG. 3, the outlet box back wall is shown seated against the barrier box back wall 9, but that condition does not occur for shallow outlet boxes. With the outlet box in the proper location within the barrier box, the electrician pounds the mounting nails 46 into the side 47 of the stud to attach the barrier box and outlet box to the stud. The relatively thick wall portion 41 aids greatly in maintaining the barrier box rigidly in place on the stud, especially if the wall 13 is made entirely with the thick portion 41. The electrician next makes slits or holes 53 in the appropriate places in the side wall portions 33, 37, or 43 that suit the electrical wires 55 for the job. After the wires have been inserted through the barrier box, the spaces around the wires at the openings 53 are sealed with accoustical or silicone caulk, not shown.

The builder installs wall insulation between the studs 49 and behind the barrier box 1 in the normal manner. He may apply a bead of accoustical or silicone caulk 61 to the front faces of the barrier box flanges 21, 23, 25, and 27. The finish wall board 63 may then be nailed in place with nails 65, as is known. The rigidity of the flanges and barrier box of the present invention precludes their distorting when the wall board 63 is nailed in place. Consequently, an effective air seal is created between the barrier box flanges and the wall board.

It is preferred, however, that the builder apply a moisture barrier film 57 over the insulation and studs before nailing the finish wall board 63 in place. The film 57 is cut, as at 59, to create an opening approximately the same size as the barrier box open side. A bead of caulk 61 is applied to the flange faces, and the film is pressed against the caulk. The rigid flanges do not bend or distort when the builder presses the film against them. Consequently, an effective air and moisture seal is created between the barrier box flanges and film. The integrity of the seal is fully observable. Finally, the finish wall board with cutout 64 is put in place against the stud faces 51 and nailed thereto with nails 65. Because of the flat rigid flanges and rigid wall portions 31, 35, 39, and 41, the finish wall board is not needed to create the air seal. Consequently, the builder is assured that the seal is functioning properly before the finish board is installed, and even though he cannot see the seal after finish board installation.

Figure 4:
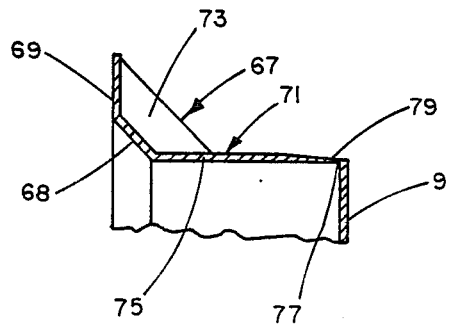
FIG. 4 is an enlarged cross sectional view showing a representative portion of a modified embodiment of the present invention.

Referring to FIG. 4, a representative portion of a modified air-vapor barrier box 67 is illustrated. In barrier box 67, an angular wall section 68 is interposed between a typical coplanar flange part 69 and associated wall 71 for three of the walls and associated flanges. Gussets 73 similar to gussets 29 described previously with respect to the air-vapor barrier box 1 are employed between the flange 69, angular wall 68, and wall 71. The fourth wall and flange, not illustrated in FIG. 4, that correspond to flange 23 and wall 13 of FIGS. 1-3, do not have the tapered wall 68 or gussets 73.

FIG. 4 also shows a modified configuration of the dual thickness barrier box top, side, and bottom walls. In the embodiment of FIG. 4, the transition between the thick wall portion 75 and the thin wall portion 77 adjacent the back wall 9' is in the form of a gradual tapering of the wall outer surface 79. Preferably, the thick wall portion 75 is approximately 0.070 inches thick, and the outer surface 79 begins tapering at approximately 0.88 inches from the back wall 9'. The preferred thickness of the thin wall portion 77 at the junction with the back wall is approximately 0.035 inches. It will be appreciated that the flange design employing the angular sections 68 of FIG. 4 may be employed with the stepped dual thickness walls of FIGS. 2 and 3. Similarly, the tapered wall design of FIG. 4 may be used in combination with the coplanar flanges 21, 23, 25, and 27 of FIGS. 1–3.

Thus, it is apparent that there has been provided, in accordance with the invention, an air-vapor barrier box that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An air-vapor barrier box comprising:
   a. a back wall;
   b. four side walls joined to the back wall to create a five-sided enclosure, each side wall being manufactured with portions of different thicknesses, the side wall portions adjacent the back wall being thinner than the side wall portions remote from the back wall;
   c. a flange joined to the free end of each side wall and extendingly outwardly therefrom and perpendicular thereto; and
   d. at least one gusset extending between at least one flange and the associated side wall to thereby increase the rigidity of the flanges and thick side wall portions.

2. An air-vapor barrier box for preventing air flow past a building wall electrical outlet box comprising:
   a. a back wall of a first predetermined thickness;
   b. a top wall, a bottom wall, and two side walls joined to the back wall to create an enclosure having five closed sides and an open side, the top, bottom, and side walls having respective first portions adjacent the back wall of a second predetermined thickness less than the first thickness and respective second portions remote from the back wall of approximately the first thickness;
   c. a flange extending outwardly from the free ends of the respective walls, the flanges being coplanar and having thicknesses approximately equal to the first wall thickness; and
   d. at least one gusset extending between the top, bottom, and one side wall and the corresponding top, bottom, and side flange to thereby impart rigidity to the flanges and side wall thick portions.

3. The air-vapor barrier box of claim 2 wherein:
   a. the air-vapor barrier box is manufactured of a soft thermosetting plastic; and
   b. the first predetermined wall thickness is approximately 0.070 inches, and the second predetermined wall thickness is approximately 0.035 inches,
   so that the back wall, flanges, and side wall thick wall portions are stiff and rigid and the side wall thin wall portions are easily openable for inserting wires from the electrical outlet box through the air-vapor barrier box.

4. The air-vapor barrier box of claim 2 wherein the transition between the first and second wall thicknesses of the top, bottom, and side walls is in the form of respective discrete steps.

5. The air-vapor barrier box of claim 2 wherein the transition between the first and second wall thicknesses of the top, bottom, and side walls is in the form of respective gradual tapers extending from the thick wall portions toward the thin wall portions adjacent the box back wall.

6. The air-vapor barrier box of claim 2 wherein at least three flanges include respective angular wall sections interposed between the respective coplanar flanges and the associated walls.

7. In combination, an electrical outlet box for receiving and connecting electrical wires and having an open side, nails passing through the outlet box for mounting the outlet box to a selected building member with the nail heads being contactable with the outlet box, and a barrier box adapted to receive the electrical outlet box and the nails, the barrier box having a back wall and four side walls connected to the back wall to form an open side enclosure substantially surrounding the respective walls of the electrical outlet box with a sufficient spacing between at least three of the outlet box walls and the corresponding barrier box walls to provide access for pounding the nail heads inside the barrier box to contact the outlet box, the barrier box having coplanar flanges extending outwardly from the free ends of the respective side walls, the barrier box flanges having reinforcing gussets extending between three flanges and the associated side walls.

8. In combination, an electrical outlet box for receiving and connecting electrical wires and having an open side, and a barrier box adapted to receive the electrical outlet box, the barrier box having a back wall and four side walls connected to the back wall to form an open side enclosure substantially surrounding the respective walls of the electrical outlet box, the barrier box having coplanar flanges extending outwardly from the free ends of the respective side walls, the barrier box flanges having reinforcing gussets extending between the three flanges and the associated side walls, wherein the barrier box back wall, flanges, gussets, and side wall portions adjacent the respective flanges are fabricated with a first thickness, and wherein the barrier box side wall portions adjacent the back wall are fabricated with a second thickness less than the first thickness to thereby provide both rigidity to the flanges and barrier box and ease of opening the barrier box for inserting electrical wires therethrough for connection within the electrical outlet box.

9. The combination of claim 8 wherein the side walls taper gradually from the thick wall portion adjacent the respective flanges toward the respective thin wall portions adjacent the barrier box back wall.

10. In combination with a building wall having vertical studs and an open side electrical outlet box for connecting electrical wires, the outlet box having nails passing therethrough with the nail heads being contactable with the outlet box for mounting the outlet box to a vertical stud, apparatus for preventing air flow past the electrical outlet box comprising:
   a. an air-vapor barrier box having a back wall, and a top wall, bottom wall, and first and second side walls connected to the back wall to create a five-sided enclosure having an open side and adapted to receive the electrical outlet box, the outlet box and the nails being located entirely within the barrier box with the barrier box top, bottom, and second side walls being spaced from the corresponding walls of the outlet box to provide driving access to the nail heads, the barrier box having flanges extending outwardly from and perpendicular to the respective top, bottom, and side walls, the flanges being coplanar and flush with the barrier box open side, the barrier box having reinforcing gussets extending between the top, bottom, and second side walls and the corresponding flanges, the barrier box first side wall being in facing contact with the side of a stud, the back surface of the flange extending from the barrier box first side wall being in facing contact with the stud face, the barrier box and electrical outlet box being secured to the stud by the nails passing through the barrier box first side wall and into the stud with the nail heads being in contact with the outlet box;

b. a thin film of air and moisture impervious material overlying the stud faces and attached thereto and covering the box and electrical receptacle, the film being cut with an opening generally coextensive with the box open side; and c. caulk means for sealing the film to the box flanges, so that air and moisture from inside the building cannot pass the electrical receptacle to the outside of the building.

11. In combination with a building wall having vertical studs and an open side electrical outlet box for connecting electrical wires, apparatus for preventing air flow past the electrical outlet box comprising:

a. an air-vapor barrier box having a back wall, and a top wall, bottom wall, and first and second side walls connected to the back wall to create a five-sided enclosure having an open side and adapted to receive the electrical outlet box, the barrier box having flanges extending outwardly from and perpendicular to the respective top, bottom, and side walls, the flanges being coplanar and flush with the barrier box open side, the barrier box having reinforcing gussets extending between the top, bottom, and second side walls and the corresponding flanges, the barrier box first side wall being located against the side of a stud, the back surface of the flange extending from the barrier box first side wall being in contact with the stud face, the barrier box and electrical outlet box being secured to the stud by means of nails passing through the electrical outlet box and the barrier box first side wall and into the stud, wherein:

i. the barrier box top, side, and bottom walls are made of varying thicknesses, with the thickness of the respective wall portions adjacent the respective flanges being greater than the thickness of the top, side, and bottom wall portions adjacent the back wall; and ii. the flange, back wall, and gusset thicknesses are approximately equal to the greater thickness of the top, side, and bottom wall portions adjacent the respective flanges, so that the barrier box is rigid at the flanges and walls adjacent thereto for enhancing sealing with the film and the barrier box is easy to penetrate through the top, side, and bottom wall portions adjacent the back wall for inserting wires through the barrier box;

b. a thin film of air and moisture impervious material overlying the stud faces and attached thereto and covering the box and electrical receptacle, the film being cut with an opening generally coextensive with the box open side; and c. caulk means for sealing the film to the box flanges, so that air and moisture from inside the building cannot pass the electrical receptacle to the outside of the building.

12. The combination of claim 11 wherein the thicknesses of the barrier box top, side, and bottom walls taper gradually from the greater thickness adjacent the respective flanges to the lesser thickness adjacent the barrier box back wall.

13. A method for preventing air flow past a building wall electrical outlet box, comprising the steps of:

a. providing a five-sided barrier box having a back wall and four side walls with an open side and having rigid coplanar flanges extending outwardly from the edges of the side walls adjacent the respective open sides thereof;

placing an electrical outlet box having nails passing therethrough within the barrier box, the nails being entirely within the barrier box;

c. placing a barrier box side wall in facing contact with the side of a building stud and the back surface of the associated barrier box flange in facing contact with the face of the stud;

d. driving the nails through the electrical outlet box and through the barrier box side wall that is in facing contact with the side of the stud and into the stud;

e. depositing a bead of caulk around the flanges; and f. fastening a finish wall panel on the stud face, so that caulk between the finish wall panel and the barrier box flanges forms an air and moisture seal.

14. An air-vapor barrier box for preventing air and moisture leakage past an open side electrical outlet box having mounting nails passing therethrough comprising:

a. a container section comprising:

i. a back wall; and ii. four side walls joined to the back wall and cooperating therewith to create a five-sided container with an open side, the back and side walls being dimensioned to entirely surround the electrical outlet box and mounting nails therethrough with the open side of the electrical outlet box protruding outside of the container section open side and to provide sufficient space between the electrical outlet box and the container section side walls to provide easy access to the heads of the electrical outlet box mounting nails; and b. a flange section comprising:

i. a flange extending outwardly from and perpendicular to each side wall at the open side of the container section, the flanges being coplanar; and ii. at least one gusset extending between three of the flanges and the respective associated side walls to provide rigidity to the flanges and to the side walls adjacent the flanges.

15. An air-vapor barrier box for preventing air and moisture leakage past an open side electrical outlet box comprising:

a. a container section comprising:

i. a back wall; and ii. four side walls joined to the back wall and cooperating therewith to create a five-sided container with an open side, the back and side walls being dimensioned to receive the electrical outlet box with the open side of the electrical outlet box protruding outside of the container section open side and to provide sufficient space around the electrical outlet box for easy access to the electrical outlet box mounting nails, wherein at lease three side walls are fabricated with portions of unequal thickness, each side wall with an unequal thickness having a first portion adjacent the container section open side of a first thickness and a second portion adjacent the container section back wall of a second thickness less than the first thickness; and the back wall, gussets, and flanges are of the first thickness; and a flange section comprising:
  i. a flange extending outwardly from and perpendicular to each side wall at the open side of the container section, the flanges being coplanar; and
  ii. at least one gusset extending between three of the flanges and the respective associated side walls to provide rigidity to the flanges and to the side walls adjacent the flanges, so that the air-vapor barrier box may be rigidly mounted by means of the electrical outlet box mounting nails through the first portion of a side wall to a support structure while permitting easy opening of the barrier box second wall portions for inserting wires therethrough.

16. The air-vapor barrier box of claim 15 wherein the respective side walls taper gradually from the greater thickness of the side wall portion adjacent the respective flanges to the lesser thickness of the side wall portions adjacent the back wall.

17. The air-vapor barrier box of claim 15 wherein:
  a. the fourth side wall is fabricated substantially of the first wall thickness; and
  b. the three side walls with varying thicknesses correspond with the three flanges having gussets extending therebetween and the respective associated walls, so that the single thickness fourth side wall increases the mounting rigidity of the air-vapor barrier box to the support structure.

* * * * *